United States Patent
Grogan

[15] 3,698,120
[45] Oct. 17, 1972

[54] FLOAT-SINKER

[72] Inventor: Daniel R. Grogan, 705 West 39th Street, San Pedro, Calif. 90731

[22] Filed: Nov. 16, 1970

[21] Appl. No.: 89,767

[52] U.S. Cl.................................43/43.14, 43/44.87
[51] Int. Cl. .......................A01k 93/00, A01k 95/00
[58] Field of Search.........................43/43.14, 44.87

[56] References Cited

UNITED STATES PATENTS

| 3,011,285 | 12/1961 | Musser | 43/44.87 |
| 2,763,088 | 9/1956 | Cowsert | 43/43.14 |
| 2,803,082 | 8/1957 | Claybrook | 43/43.14 |
| 3,012,359 | 12/1961 | Foster | 43/43.14 |

FOREIGN PATENTS OR APPLICATIONS

| 1,036,232 | 4/1953 | France | 43/43.14 |

Primary Examiner—Samuel Koren
Assistant Examiner—Daniel J. Leach
Attorney—Fulwider, Patton, Rieber, Lee & Utecht

[57] ABSTRACT

A float-sinker for mounting to a fishing line and including a float chamber having water passages for flooding the float chamber. The lower end of a vent tube projecting through the upper portion of the float chamber determines the level to which water can rise in the float chamber. After the float-sinker is cast, water enters the float chamber and the float-sinker slowly sinks toward the bottom with the associated hooks, bait, and the like. Upon withdrawal of the float-sinker from the water, the water remaining in the float chamber provides additional weight to aid in casting. The float-sinker may be fixed to the line or slidable thereon within certain limits.

12 Claims, 6 Drawing Figures

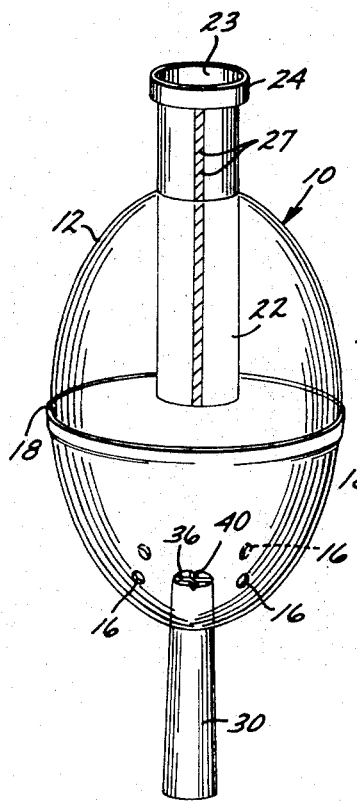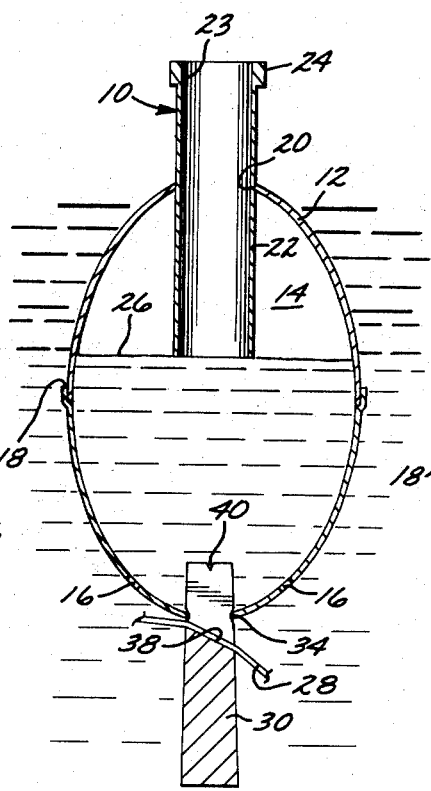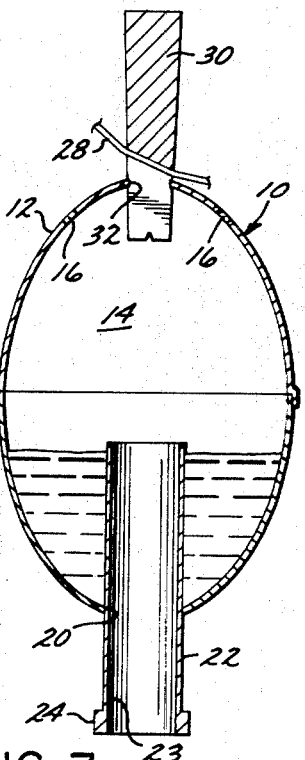
FIG.1  FIG.2  FIG.3
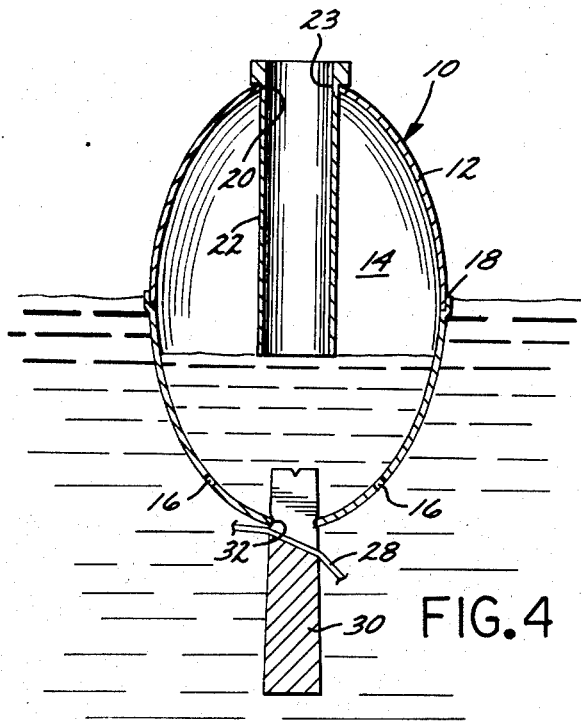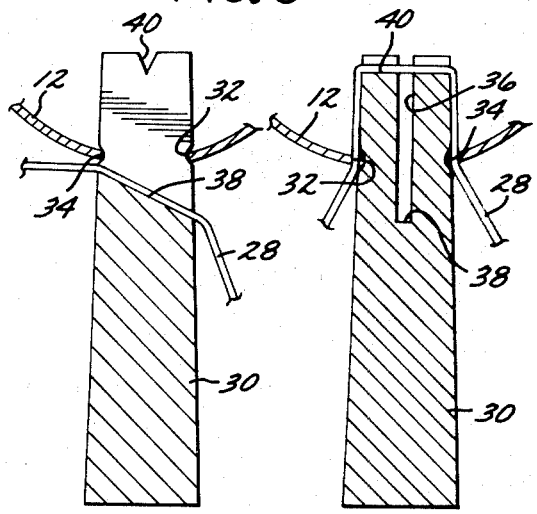
FIG.4  FIG.5  FIG.6
INVENTOR.
DANIEL R. GROGAN
ATTORNEYS

FLOAT-SINKER

BACKGROUND OF THE INVENTION

1. Field of the Invention

The present invention relates to a fishing line float, and more particularly to a fishing line float having variable buoyancy.

2. Description of the Prior Art

Most fishing line float-sinker combinations comprise a buoyant float attached to the fishing line for casting with a separately attached sinker, hook and bait. The sinker immediately sinks to a depth which is determined by the amount of line between the hook and the float, and the float maintains the hook at that depth. This technique is undesirable in that the sinker rapidly carries the hook and bait down to the depth established by the location of the float, and the intermediate levels or strata of water are not fished. Preferably, the bait should slowly sink through all levels of water so that any fish in the various levels will have an opportunity to take the bait. Moreover, if a bad cast places the sinker in an improper location, there is little or no opportunity for the fisherman to correct the placement by reeling in the line, because the sinker usually reaches the bottom so rapidly that reeling in the line presents the danger of snagging the line on underwater obstacles.

SUMMARY

According to the present invention, a float-sinker is provided which comprises a body having a float chamber with one or more water passages opening into the chamber so that the chamber can be flooded when the float-sinker is cast upon the surface of a body of water. The buoyancy of the body is affected by the amount of water entering the float chamber and this in turn is controlled by a vent tube which projects into the upper portion of the float chamber, the air in the float chamber venting through the tube. With this arrangement the water level rises no higher than the lower end of the vent tube. Consequently, when the fisherman casts his line with the float-sinker mounted to it, the float-sinker will slowly fill with water and, depending upon the degree of projection of the vent tube into the float chamber, with either float in an upright position or slowly sink to the bottom until the sinker attached to the fishing line reaches the bottom. The hook and bait are normally located on the line between the sinker and the float and will therefore be disposed at any predetermined level. With this arrangement the slow rate of filling of the float-sinker allows the fisherman to correct a bad cast by reeling in or moving the fishing line until the float-sinker and its associated hook and bait are better located for a strike. In addition, the slow sinking of the float-sinker through the various strata of water allows fish in any of these strata to strike the bait as it sinks downwardly.

The means for mounting the float-sinker to the fishing line include one arrangement whereby the fishing line is fixed to the float-sinker so that there is no relative movement between the two, and another arrangement in which a stop is attached to the fishing line, and the fishing line is slidably mounted to the float-sinker so that the float-sinker moves relative to the line until it reaches the stop, whereby the float-sinker can slide upwardly relative to the line until it reaches some desired point, such as immediately adjacent the point where the hook or hooks are attached.

Other objects and features of the invention will become apparent from consideration of the following description taken in connection with the accompanying drawing.

BRIEF DESCRIPTION OF THE DRAWING

FIG. 1 is a perspective view of a float-sinker according to the present invention;

FIG. 2 is a longitudinal cross sectional view of the float-sinker of FIG. 1 immersed in water;

FIG. 3 is a longitudinal cross sectional view of the float-sinker of FIG. 2, but showing the water entrapped in the float-sinker when it is withdrawn from the water after a cast;

FIG. 4 is a longitudinal cross sectional view similar to that of FIG. 2, but illustrating to that of the vent tube moved inwardly into the float chamber to increase the buoyancy of the float-sinker to an extent such that it floats upon the surface of the water;

FIG. 5 is an enlarged longitudinal cross sectional view of the line mounting plug of the float-sinker of FIG. 2, illustrating one line mounting arrangement; and FIG. 6 is an enlarged longitudinal cross sectional view of the line mounting plug of FIG. 5, but taken at right angles thereto to show another line mounting arrangement.

DESCRIPTION OF THE PREFERRED EMBODIMENTS

Referring now to the drawings, and particularly to FIGS. 1–5, there is illustrated a float-sinker 10 which is preferably made of transparent plastic material so that it is not easily seen by fish. It includes a two-part, egg-shape body 12 having a hollow interior which defines a float chamber 14. The body 12 could be made in other shapes, such as a ball or teardrop, if desired, and it could also be made of one piece construction. The lower part of the body 12 includes openings to the exterior which constitute water passages 16 to permit water to enter the chamber 14 when the body 12 is cast upon the water. As will be seen, the weight of the sinker (not shown) usually used in this type of fishing disposes the float-sinker 10 in an upright position when it is cast upon the water so that the water passages 16 are located below the water surface to permit water to enter and flood the chamber 14.

The two parts of the body 12 sleeve together at 18, and their overlapping margins are coated with a suitable adhesive or solvent to adhere the two parts together in fluid tight relation.

The portion of the body 12 includes a circular, relatively large central opening 20 which slidably receives an elongated control or vent tube 22 having a venting passage 23. The tube 22 is made of a resilient plastic material to have a slight amount of flex to it. This allows the diameter of the opening 20 to be made slightly smaller than the outside diameter of the tube 22, and the tube walls will flex inwardly enough to allow insertion of the tube 22 into the opening 20. The fit between the tube 22 and the margin defining the opening 20 is then sufficiently snug that although the tube 22 can be forcibly moved inwardly and outwardly of the body 12 by pushing and pulling on it, an air tight seal is provided to prevent air from escaping and the axial position of the tube tends to stay the same. The top of the tube 22 includes an integral flange 24 to facilitate gripping the tube 22 for movement in and out of the body 12.

As best viewed in FIG. 2, the location of the lower end of the vent tube 22 determines the level 26 to which the float chamber 14 can be flooded with water, which in turn determines the negative buoyancy of the float-sinker 10 and rapidity of sinking. Consequently, by pulling out or pushing in the tube 22 relative to the body 12, the sinking character of the float-sinker 10 can be adjusted.

When the fisherman has determined what location of the vent tube 22 gives him the best results, he can always relocate the tube 22 in this position by referring to indicia on the tube. As shown in FIG. 1, such indicia takes the form of a plurality of short diagonal lines 27 which are axially spaced along the length of the tube. Although not shown, numerals can be placed adjacent the lines 27 at suitable intervals to facilitate the proper location of the tube 22 relative to the margin of the opening 20. The lines 27 are merely exemplary and any suitable indicia can be used for this purpose, as will be apparent.

The fishing line, a portion of which is shown at 28, is mounted to the float-sinker 10 by an elongated wedge or plug 30 having a circular cross section and characterized by a taper of decreasing cross section from its outer to its inner end, as best seen in FIGS. 5 and 6. The taper enables the plug 30 to be removably wedged within a central, circular opening or seat 32 provided in the lower portion of the body 12. The plug 30 includes a reduced diameter portion or circumferential groove 34 which receives the seat 32 in snug relation.

As best seen in FIGS. 5-6, the upper extremity of the plug 30 includes a diametrical, axially extending slot 36 whose inward terminus or base 38 is located externally of the seat 32 when the plug 30 is mounted in operative position upon the body 12. The base 38 is inclined or slanted downwardly from the reel side to the weighted or sinker side of the line 28, as best seen in FIGS. 2 and 5, at an angle of approximately 45°. This eliminates sharp bends in the line and enables the weight of the sinker to more easily slide the line 28 downwardly without pulling the float-sinker 10 downwardly with it, as will be discussed later.

The diameter of the plug 30 above the groove 34 is larger than the diameter of the seat 32, and the presence of the slot 36 enables the upper extremity of the plug 30 to be compressed to enable it to be wedged into the body 12 until the groove 34 receives the margin of the opening or seat 32. The transparent plastic material of which the plug 30 is preferably made is sufficiently resilient that the upper extremity of the plug 30 springs back to its undeformed configuration once the groove 34 is aligned with the seat 32. This provides a snug fit and also securely prevents the plug 30 from being inadvertently pulled out of the seat 32, such as when a strain is taken on the fishing line 28.

The slot 36 is made sufficiently wide that the largest of the popular sizes of fishing lines will easily slide through it, but narrow or small enough that by tying one or more knots in the line, the knot will be able to act as a stop means to prevent relative movement of the float-sinker 10 past some predetermined point on the fishing line 28. Alternatively, a small bead (not shown) like the conventional split shot weights which are frequently used as sinkers, can be attached to the line 28 to perform the same function. Another way of providing a stop in the line, and which avoids possible weakening of the line caused by tying knots in the line itself, is to take a short piece of line, knot it on the fishing line 28, and cut off the excess length.

The sliding action of the line 28 through the slot 36 can be improved by placing a smooth-surfaced metal insert (not shown) at the base of the slot 36. Alternatively, the surfaces of the slot 36 could be coated with a friction reducing material such as tetrafluoroethylene or the like.

Rather than mounting the line 28 so it is slidable relative to the plug 30, it can be fixed relative to the plug 30 if desired, thereby fixedly locating the body 12 relative to some predetermined point on the line 28. As best seen in FIGS 5-6, the upper extremity of the plug 30 also includes a second groove or slit 40 disposed transversely of the slot 36 and extending only a short distance so that it is located internally of the seat 32 when the plug 30 is mounted in position upon the body 12. The base of the slit 40 narrows to provide a wedging action so that the line 28 can be wedged in position and held while the plug 30 is being inserted into the seat 32. Because the base of the slit 40 is located inwardly of the seat 32, the line 28 is wedged between the plug 30 and the margin of the seat 32 when the plug 30 is in position on the body 12.

In operation, the line 28 is placed either in the slot 36 for a slidable arrangement, or in the groove 40 for a fixed arrangement. If the former is selected, a knot or stop is placed in the line 28 somewhere above the baited hook, as desired. If the fixed arrangement is chosen, the line 28 is placed in the groove 40 about where the stop would have been placed if the slidable arrangement had been selected. In either case, the line is mounted to the plug 30 and the plug is then wedged in seated position upon the seat 32. The float-sinker 10 and its associated baited hook and sinker are then cast onto the water.

Water begins to relatively slowly enter the float chamber 14 through the water passages 16 as air escapes through the central venting passage 23 of the vent tube 22. Water will flood into the float chamber 14 until it reaches the level 26 shown in FIG. 2, as dictated by the location of the lower end of the vent tube 22. During the relatively slow flooding of the chamber 14 the fisherman has time to drag his line to the exact point that he wishes, which is particularly desirable where the cast was far off target. The time that it takes the float chamber 14 to fill can be adjusted by providing more or larger passages 16, as will be apparent.

As previously indicated, the tube 22 can be pushed in or pulled out of the float chamber 14 to control the amount of air trapped in the chamber so that the float-sinker 10 can be made to slowly sink to the bottom and thereby slowly cover all levels or strata of the body of water that might contain fish. The slow sinking rate of the bait is believed to be more attractive to the fish. Preferably the vent tube 22 is adjusted so that after the sinker reaches the bottom the float-sinker 10 will be buoyant enough to hold the baited hook above any vegetation on the bottom. If desired, the vent tube 22 could be pulled outwardly so that almost all of the chamber 14 is flooded with water, in which case the float-sinker 10 would have a negative buoyancy and serve as a sinker itself. In the event that the fisherman wishes to have the float-sinker 10 serve purely as a float on the surface of the water, such positive buoyancy is easily provided by simply probing the tube 22 in as shown in FIG. 4.

The line mounting arrangement of FIG. 5 is advantageous because it reduces the amount of line 28 between the sinker and the float-sinker 10 on casting. This makes it easier to cast and yet, once the float-sinker 10 is cast, it can slide on the line 28 away from the sinker side of the line to any desired extent, as determined by the location of the stop means on the line.

When the float-sinker 10 is withdrawn from the water for recasting, the float-sinker 10 will be inverted as seen in FIG. 3. A certain amount of water will be trapped in the float chamber 14 because of its inability to flow out of the now upwardly located water passages 16. This gives the float-sinker 10 additional weight, which aids in casting it greater distances.

From the foregoing, it will be apparent that the float-sinker 10 can be used as either a float or a sinker. It allows the baited hook to sink at a slower and more natural rate, and permits all levels of the body of water to be fished during such drinking. Once the sinker rests upon the bottom, the float-sinker 10 is adapted to hold the baited hook up and out of bottom vegetation that might otherwise obscure it.

The filling rate and buoyancy of the float-sinker is easily adjusted to accommodate various weights of sinker, bait and hooks by adjusting the position of the vent tube 22. The mounting plug 30 provides a simple and easy means for attaching the float-sinker to the fishing line in either fixed or slidable mounting arrangements, and the combination of the float chamber 14 and vent tube 22 provides for water entrapment so that on recasting the fisherman can cast a greater distance. The slow filling rate of the float-sinker 10 allows the fisherman to overcast, and then drag the line directly over the spot where he wishes it to sink.

In the foregoing description the float-sinker 10 was maintained in an upright position on striking the water by a conventional sinker (not shown) attached to the fishing line 28 below the float-sinker 10. However, if desired, this same result could be obtained by altering the center of gravity of the float-sinker 10 itself. For example, the bottom of the float-sinker 10 could be made extra thick, extra weight could be placed in the bottom of the float-sinker 10, or the plug 30 could be made heavier by weighting it, enlarging its diameter, or lengthening it. One or all of these alternatives could be used to properly orient the float-sinker 10 so that the passages 16 can allow water to flood the float-sinker 10.

Various modifications and changes may be made with regard to the foregoing detailed description without departing from the spirit of the invention.

I claim:

1. A float-sinker adapted for mounting to a fishing line, said float-sinker comprising:

body means including a float chamber and a normally open water passage opening into said chamber from the exterior of said body means whereby water can flow into said chamber at any time upon immersion of said body means in water; and control means on said body means and including a vent portion projecting into said chamber and defining a normally open vent passage opening into said chamber from the exterior of said body means whereby the location of the opening in said vent passage determines the level to which water may rise in said chamber to thereby establish the relative buoyancy of said float-sinker.

2. A float-sinker according to claim 1 wherein said vent portion projects downwardly into said chamber through the upper portion of said chamber, and said water passage opens into the lower portion of said chamber.

3. A float-sinker according to claim 2 wherein said vent portion is adjustably movable inwardly and outwardly of said chamber whereby said level of water may be adjusted thereby to adjust said relative buoyancy.

4. A float-sinker according to claim 3 and including an enlarged portion on said vent portion to facilitate gripping said vent portion and to form a stop to limit inward movement of said vent portion.

5. A float-sinker according to claim 3 wherein said vent portion comprises a tube projecting downwardly into said chamber through the upper portion of said chamber.

6. A float-sinker according to claim 5 wherein said tube includes indicia displaying the extent of projection of said tube into said chamber.

7. A float-sinker according to claim 1 and including fishing line mounting means carried at the bottom of said body means, said mounting means including a line opening for slidably receiving a fishing line, said line opening including stop means adapted for engagement with a stop on said line to locate said float-sinker relative to said line.

8. A float-sinker according to claim 7 wherein said body means includes a seat opening, said mounting means comprises a plug having a peripheral groove removably receiving the margin of said seat opening, and said line opening comprises a slot in said plug, the base of said slot being located externally of said seat opening.

9. A float-sinker according to claim 8 wherein said base slopes downwardly in the direction of the hook end of said line.

10. A float-sinker according to claim 1 wherein the bottom of said body means includes a seat opening, and including fishing line mounting means comprising a plug removably wedged in said seat opening and having a line receiving slot, the base of said slot being located internally of said opening whereby a fishing line disposed in said slot can be wedged between said plug and said seat opening to prevent movement of the float-sinker along said fishing line.

11. A float-sinker according to claim 10 wherein said base of said slot is V-shape to wedgably receive said fishing line therein.

12. A float-sinker according to claim 1 wherein the center of gravity of said float-sinker is located to place said water passage below the water surface when the float-sinker is cast upon the water.

* * * * *